United States Patent [19]
Tonosaki

[11] Patent Number: 5,914,700
[45] Date of Patent: Jun. 22, 1999

[54] IMAGE RECORDING/REPRODUCING APPARATUS DISPLAYING OBJECT IMAGES AND REPRODUCED IMAGES

[75] Inventor: Satoshi Tonosaki, Tokyo, Japan

[73] Assignee: Canon Kabushiki Kaisha, Tokyo, Japan

[21] Appl. No.: 08/848,679

[22] Filed: Apr. 29, 1997

[30] Foreign Application Priority Data

May 24, 1996 [JP] Japan ................................. 8-129898

[51] Int. Cl.⁶ .............. G09G 3/28; G09G 3/36; G09G 5/10; G09G 5/04
[52] U.S. Cl. ................. 345/102; 345/63; 345/104; 345/147; 345/148; 345/186
[58] Field of Search ................. 345/63, 88, 89, 345/102, 104, 132, 133, 141, 147, 148, 186, 192, 509

[56] References Cited

U.S. PATENT DOCUMENTS

| | | | |
|---|---|---|---|
| 4,818,979 | 4/1989 | Manson | 345/115 |
| 4,827,255 | 5/1989 | Ishii | 345/148 |
| 5,479,188 | 12/1995 | Moriyama | 345/147 |
| 5,539,432 | 7/1996 | Kobayashi | 345/199 |
| 5,636,041 | 6/1997 | Pearce et al. | 345/147 |
| 5,734,362 | 3/1998 | Eglit | 345/147 |

*Primary Examiner*—Vijay Shankar
*Attorney, Agent, or Firm*—Fitzpatrick, Cella, Harper & Scinto

[57] ABSTRACT

An image display apparatus for displaying an image represented by an image signal corresponding to an object and a reproduced image represented by an image signal reproduced from a storage medium includes a display device provided with a first display mode that permits binary image displays at a low-brightness level and at a high-brightness level and a second display mode that permits multi-level image displays at the low-brightness level, the high-brightness level and at an intermediate level. The brightness level in the display device is set to be lower when the display device displays in the first display mode than when the display device displays in the second display mode. Thus, a low power consumption, easy-to-use and long battery life image display apparatus is provided.

28 Claims, 6 Drawing Sheets

IMAGE RECORDING/REPRODUCING APPARATUS DISPLAYING OBJECT IMAGES AND REPRODUCED IMAGES

BACKGROUND OF THE INVENTION

1. Field of the Invention

The present invention relates to an image display apparatus having a display device for presenting an image represented by an image signal corresponding to an object and a reproduced image represented by an image signal reproduced from a storage medium.

2. Description of the Related Art

Electronic still video cameras and VCR-integrated cameras are examples of an image display apparatus having a display device for presenting an image represented by an image signal corresponding to an object and a reproduced image represented by an image signal reproduced from a storage medium. Some conventional electronic still cameras and VCR-integrated cameras are not equipped with a display device for presenting an image being picked up or an image being reproduced. These conventional apparatuses are provided with individual marks associated with dials and switches that are used for setting imaging parameters during a recording operation and reproducing parameters during a reproducing operation, and are also provided with a dedicated display for presenting settings. When a diversity of parameters are set in these apparatuses during an image recording or reproducing operation, the dials and switches are operated while monitoring the dedicated display.

Some electronic video cameras and VCR-integrated cameras have a display device for presenting an image being picked up or an image being reproduced. To set imaging parameters during a recording operation and reproducing parameters during a reproducing operation, these apparatuses generate character image signals representing characters and symbols corresponding to settings in response to the positions of the dials and switches. The character images represented by the character image signals are superimposed on the picked image or reproduced image on the display device. An operator operates the dials and switches for proper settings while monitoring the content presented on the display device.

Considering the portability of these conventional apparatuses, miniaturization of the battery as a power source may be contemplated. However, a smaller battery means a smaller capacity and a shorter battery operation time allowed for the apparatus.

As described above, the electronic video cameras and VCR-integrated cameras that have a display device for presenting an image being picked up and an image being reproduced take the following series of steps in the parameter setting: a character image signal representing characters and symbols corresponding to the settings of dials and switches is generated, the character image represented by the character image signal is superimposed on a picked image or a reproduced image on the display device, and an operator operates the dials and switches for proper parameter setting while monitoring the content presented on the display device for verification. Throughout the above steps, the battery constantly feeds power to the display device, and operation time is accordingly shortened.

SUMMARY OF THE INVENTION

It is an object of the present invention to provide an image display apparatus free from the above problems.

It is another object of the present invention to provide an image display apparatus that consumes less power without degrading ease of use.

The image display apparatus of the present invention, in one aspect, for presenting an image represented by an image signal corresponding to an object and a reproduced image represented by an image signal reproduced from a storage medium, comprises:

display means, provided with a first display mode that permits binary image displays at a low-brightness level and at a high-brightness level and a second display mode that permits multi-level image displays of the low-brightness level, the high-brightness level and an intermediate level, for presenting the image represented by the image signal corresponding to the object and the reproduced image represented by the image signal reproduced from the storage medium, and control means for controlling a brightness level in the display means to be lower when the display means displays in the first display mode than when the display means displays in the second display mode.

It is yet another object of the present invention to provide an image display apparatus that operates for a long period of time.

The image display apparatus of the present invention, in another aspect, for presenting an image represented by an image signal corresponding to an object and a reproduced image represented by an image signal reproduced from a storage medium, comprises:

display means, provided with a first display mode for presenting a diversity of information when imaging parameters for the object are set and when reproducing parameters for the image signal reproduced from a storage medium, and a second display mode for presenting the picked image and the reproduced image, for presenting the image represented by the image signal corresponding to the object and the reproduced image represented by the image signal reproduced from the storage medium, and control means for controlling a driving frame rate in the display means to be lower when the display means displays in the second display mode than when the display means displays in the first display mode.

Other advantages and features of the present invention will become more apparent when the following description of the present invention is considered with the following drawings.

DESCRIPTION OF THE PREFERRED EMBODIMENTS

Figure 1:
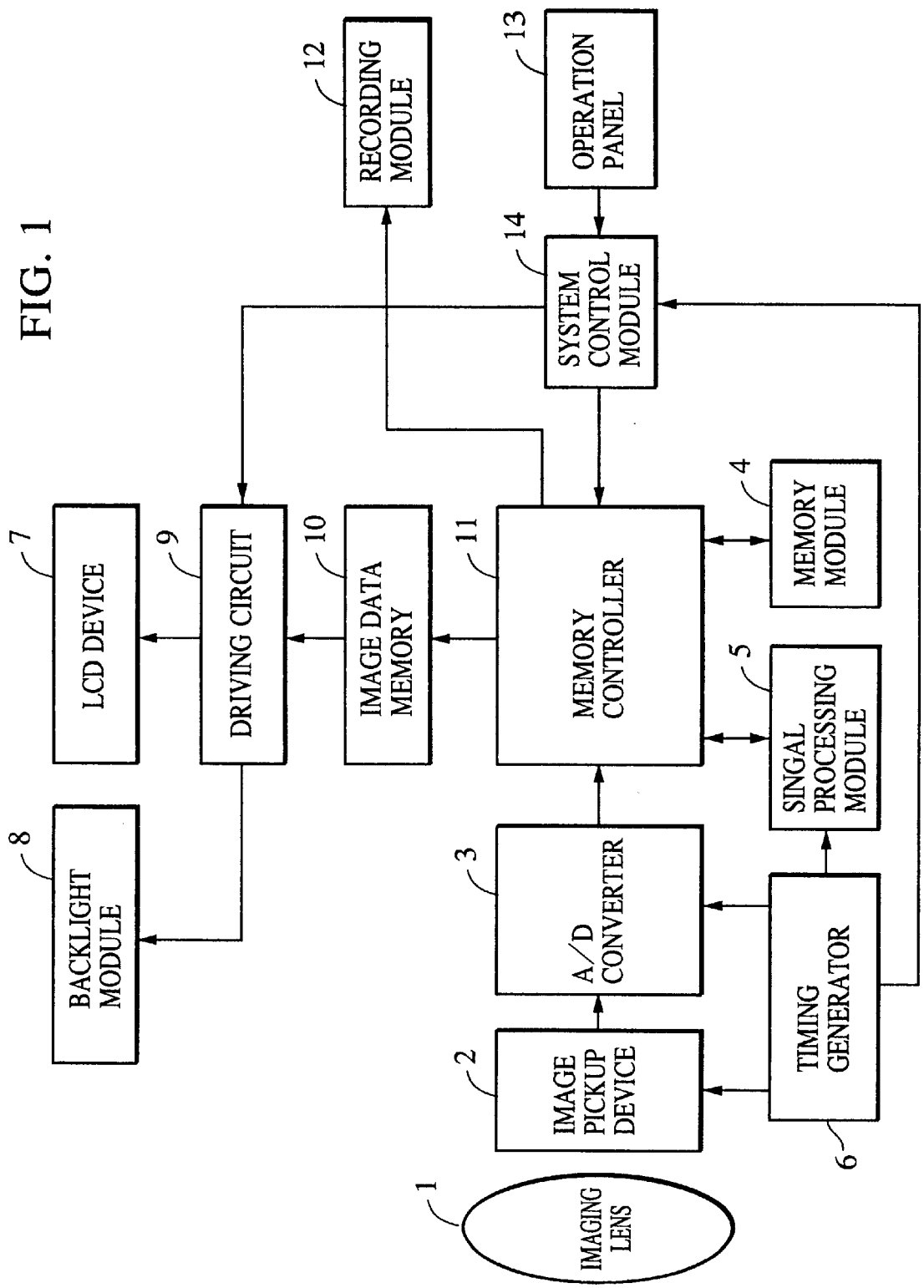
FIG. 1 is a block diagram showing the construction of an image recording and reproducing apparatus according to one embodiment of the present invention.

FIG. 1 is a block diagram showing a image recording and reproducing apparatus according to one embodiment of the present invention.

Figure 2:
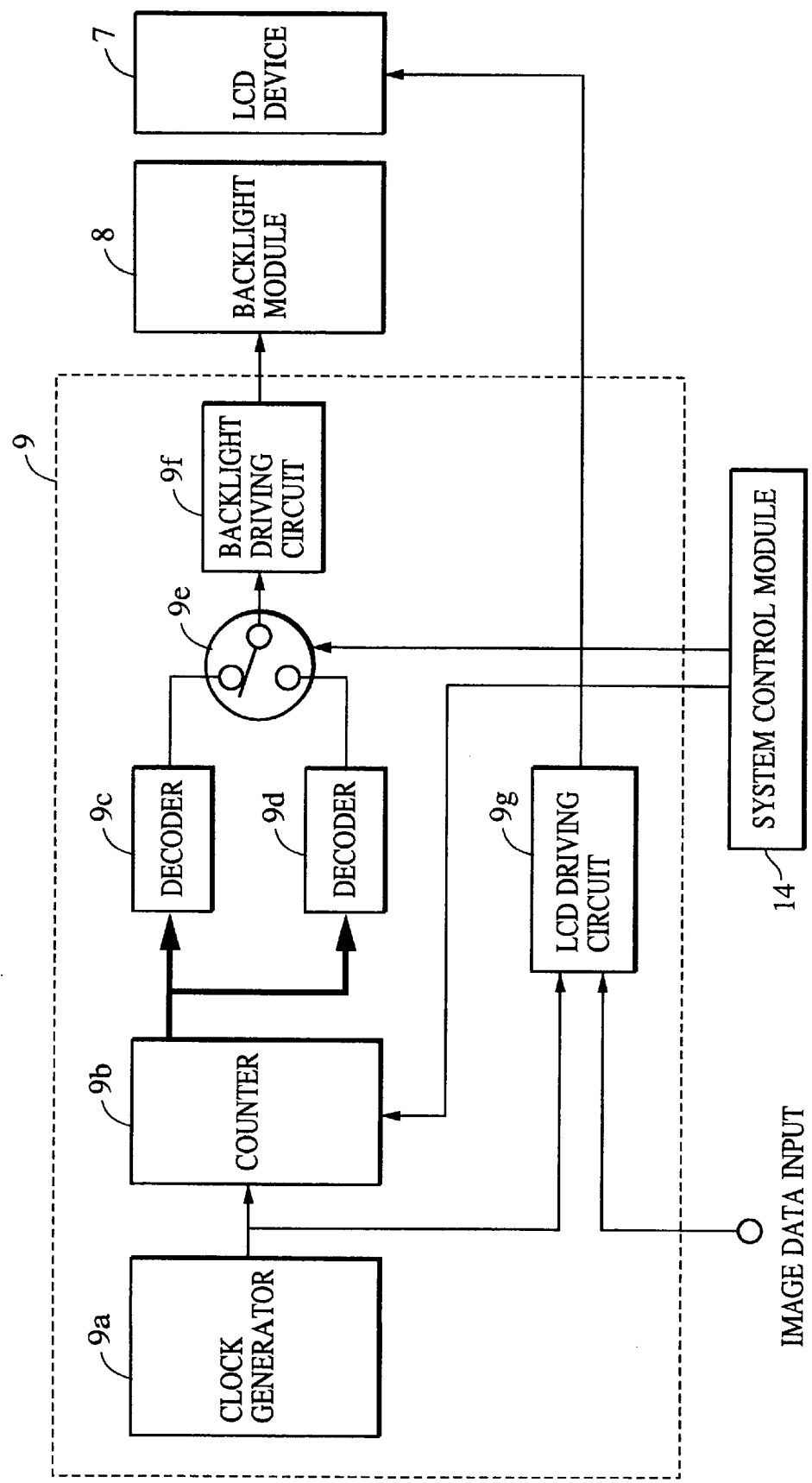
FIG. 2 is a block diagram showing one arrangement of the driving circuit 9 in the image recording and reproducing apparatus of FIG. 1.
Figure 5:
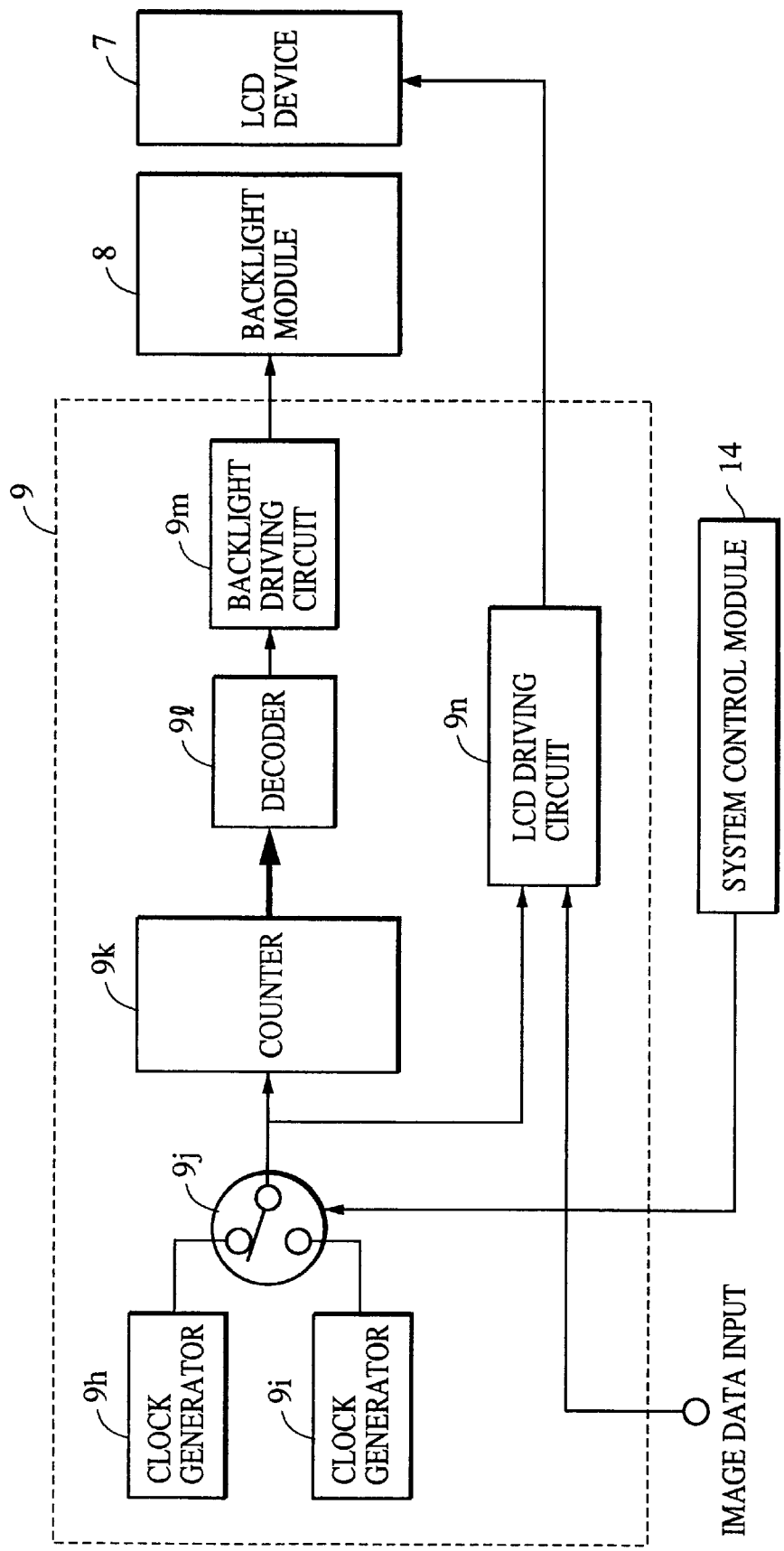
FIG. 5 is a block diagram showing another arrangement of the driving circuit 9 in the image recording and reproducing apparatus of FIG. 1.

Each of the elements shown in block outline in FIG. 1, as well as in FIGS. 2 and 5, is well known per se, and a specific type of construction is not critical to carrying out the invention or to a disclosure of the best mode for carrying out the invention.

Shown in FIG. 1 are an imaging lens 1 for forming an image of an object on the image plane of an image pickup device, an image pickup device 2 for converting the image of the object focused by the imaging lens 1 into an electrical signal (hereinafter referred to as an image signal), an analog/digital converter (hereinafter referred to as an A/D converter) 3 for analog-to-digital converting the image signal output from the image pickup device 2 into a digital signal, a memory module 4 for storing the digital image signal (hereinafter referred to as image data) from the A/D converter 3 in the course of process of the image data, a signal processing module 5 for subjecting the image data from the A/D converter 3 to a diversity of signal processes, and a timing generator 6 for generating various driving pulses for operating the image pickup device 2, A/D converter 3 and signal processing module 5.

Figure 4:
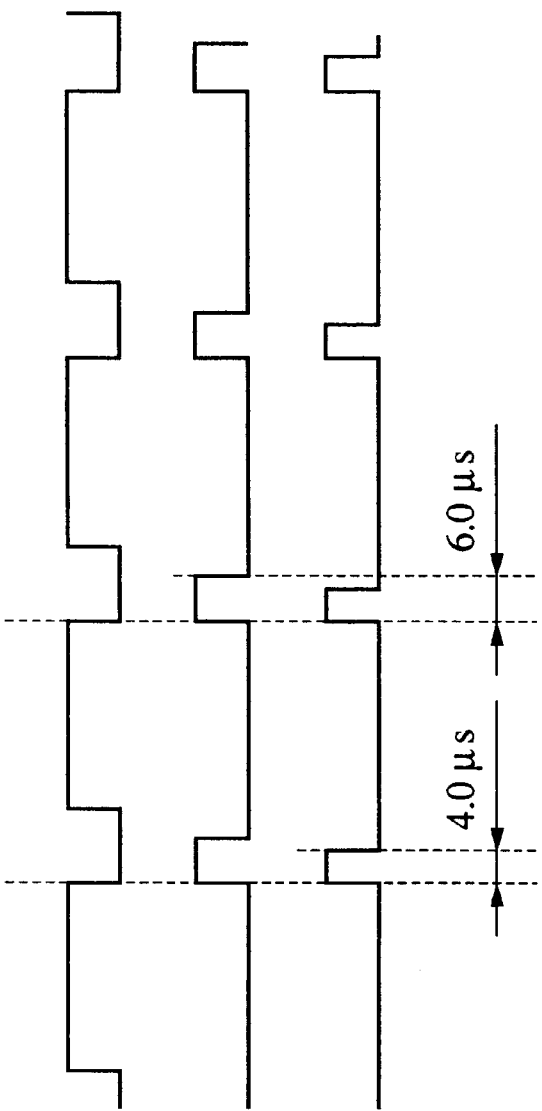
FIGS. 4A, 4B and 4C are waveform diagrams of backlight driving pulses the driving circuit 9 of FIG. 2 outputs to a backlight module 8.

Also shown in FIG. 1 are a liquid crystal display device 7 for presenting in a visible format the content of the image data output from the A/D converter 3, a backlight module 8 for illuminating the display section of the liquid crystal display device 7 from its back side, a driving circuit 9 for receiving the image data from the A/D converter 3, driving the liquid crystal display device 7 based on the image data being input, and selectively outputting to the backlight module 8 two types of driving pulses having different pulse widths as shown in FIGS. 4A–4C, an image data memory 10 for storing the image data to be presented on the liquid crystal display device 7, and a memory controller 11 for controlling the input and output of image data to and from each of the memory module 4, signal processing module 5, and image data memory 10.

Further shown in FIG. 1 are a recording module 12 for recording on a storage medium the image data from the A/D converter 3, an operation panel 13 for inputting command signals and setting signals to a system control module 14 to be described later, when an operator operates the apparatus for commands and settings, and the system control module 14 for controlling the timing generator 6, driving circuit 9, and memory controller 11 according to the commands input through the operation panel 13.

The recording operation of the image recording and reproducing apparatus shown in FIG. 1 is now discussed.

The image recording and reproducing apparatus is now switched on. The system control module 14 monitors the status of a switch arranged in the operation panel 13 for selecting an operation mode. When the switch selects a recording mode, the apparatus is put into an imaging operation.

In the imaging operation, the image pickup device 2 converts the image focused through the imaging lens 1 into an image signal, which is then applied to the A/D converter 3. The A/D converter 3 A/D converts the image signal into image data, which is then fed to the memory controller 11.

The memory controller 11 stores the image data in its memory module 4. Once the image data covering one page is stored in the memory module 4, the memory controller 11 read the image data stored in the memory module 4, and outputs it to the signal processing module 5 to subject the image data to signal processings including color conversion, data thinning, averaging, and number-of-pixel adjustment processings.

The image data, after being subjected to various types of processings at the signal processing module 5, is transferred to the image data memory 10 by the memory controller 11. The image data stored in the image data memory 10 is read sequentially to the driving circuit 9, and is then presented on the liquid crystal display device 7 as a visible image.

When a release switch arranged in the operation panel 13 for starting recording is pressed in the course of the above imaging operation, the apparatus is shifted to an image recording operation. The image data output from the A/D converter 3 is input to the memory controller 11 and is then stored in the memory module 4.

The image data stored in the memory module 4 is subjected to data compression for recording through the signal processing module 5, and is then stored in a storage medium such as a memory card in the recording module 12.

The reproducing operation of the image recording and reproducing apparatus shown in FIG. 1 is now discussed.

Referring to FIG. 1, the system control module 14 monitors the status of the switch arranged in the operation panel 13 for selecting an operation mode. When the switch selects a reproducing mode, the apparatus is put into a reproducing mode.

In the reproducing mode, the memory controller 11 reads desired image data out of a plurality of image data stored in the storage medium in the recording module 12 according to an image selection instruction from the operation panel 13. The read image data is stored in the memory module 4. Once the image data covering one page is stored in the memory module 4, the memory controller 11 reads the image data from the memory module 4, and outputs it to the signal processing module 5 to subject the image data to signal processings for the reproducing operation, including color conversion, data thinning, averaging, and number-of-pixel adjustment processings.

The image data, after being subjected to various types of processings at the signal processing module 5, is transferred to the image data memory 10 by the memory controller 11. The image data stored in the image data memory 10 is read sequentially to the driving circuit 9, and is then presented on the liquid crystal display device 7 as a visible image.

FIG. 2 is a block diagram showing, as a first embodiment of the present invention, one arrangement of the driving circuit 9 in the image recording and reproducing apparatus of FIG. 1. FIGS. 4A–4C are waveform diagrams of backlight driving pulses the driving circuit 9 of FIG. 2 outputs to the backlight module 8.

Referring to FIG. 2, a clock pulse output from a clock generator 9a in the driving circuit 9 is counted by a counter 9b. Count data corresponding to a count output from the counter 9b is supplied to each of decoders 9c and 9d. The counter 9b is reset in synchronization with a horizontal synchronization signal (refer to FIG. 4A) supplied by the system control module 14.

The decoders 9c and 9d decode count data, having different counts, to output positive backlight driving pulses having different pulse widths as shown in FIGS. 4B and 4C. In response to a control signal from the system control module 14, a switch 9e selects and outputs one of the backlight driving pulses output from the respective decoders 9c and 9d, to a backlight driving circuit 9f. The backlight driving circuit 9f drives the backlight module 8 based on the backlight driving pulse supplied by one of the decoders 9c and 9d via the switch 9e, and then illuminates from behind the display section of the liquid crystal display device 7 driven by a liquid crystal display driving circuit 9g.

Figure 3:
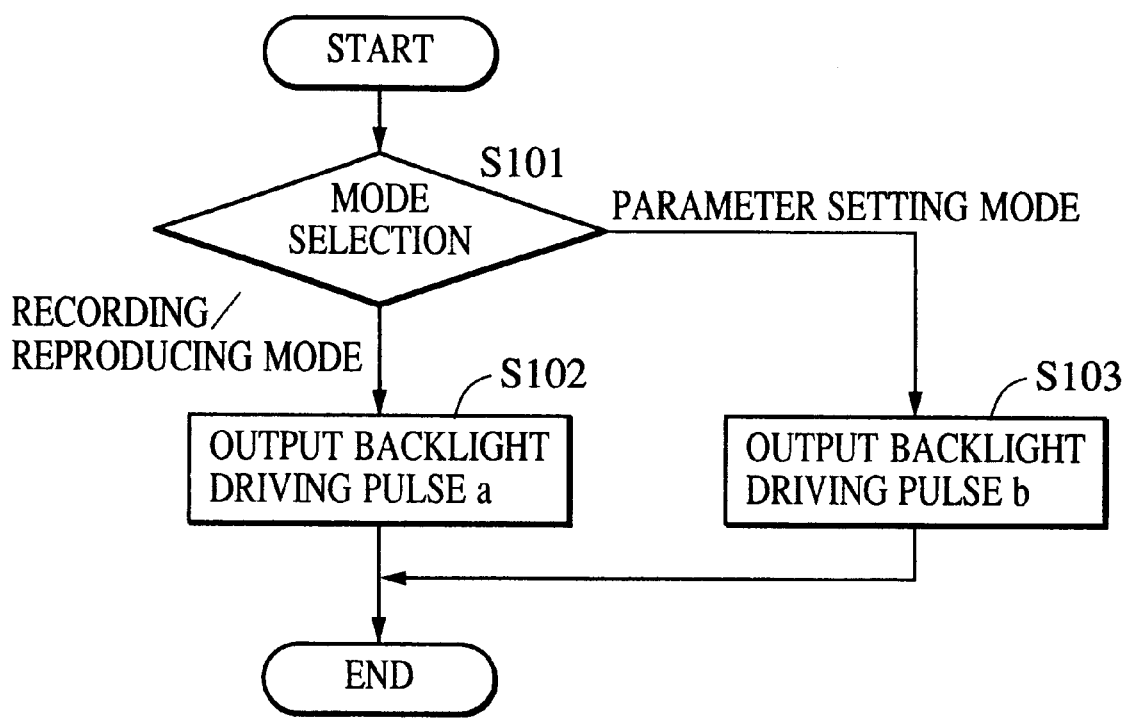
FIG. 3 is a flow diagram of a backlight driving operation by the driving circuit 9 of FIG. 2.

FIG. 3 is a flow diagram showing the backlight driving operation of the driving circuit 9 shown in FIG. 2.

Referring to the flow diagram shown in FIG. 3, the backlight driving operation in the image recording and reproducing apparatus according to the first embodiment of the present invention is now discussed.

When the image recording and reproducing apparatus is switched on, the system control module 14 checks the statuses of switches arranged on the operation panel 13 (step S101).

When the recording mode or the reproducing mode is selected by the mode selection switch on the operation panel 13, the system control module 14 outputs the control signal to the switch 9e in the driving circuit 9 shown in FIG. 2, connects the switch 9e to the output of the decoder 9c, and thus supplies to the backlight driving circuit 9f the backlight driving pulse "a" (having a pulse width of 6.0 µs, for example) shown in FIG. 4B (step S102).

When a parameter setting mode is selected by the mode selection switch on the operation panel 13 to set a diversity of parameter values in the recording mode or reproducing mode (settings for an exposure, an exposure time, a self-timer, and reproduction method of multiple images, for example), the system control module 14 issues the control signal to the switch 9e in the driving circuit 9 shown in FIG. 2. The system control module 14 connects the switch 9e to the output of the decoder 9d, and thus supplies to the backlight driving circuit 9f the backlight driving pulse "b" (having a pulse width of 4.0 µs, for example) shown in FIG. 4C (step S103).

When the display device presents text-based information as in the parameter setting mode, a difference in brightness level between a low-brightness display area (a background display, for example) and a high-brightness display area (text, for example) is great on a display screen with an intermediate brightness level area marginally occupying the entire display screen. Thus, the pulse width of the backlight driving pulse supplied to the backlight driving circuit 9f is set shorter than during the recording/reproducing mode. Even if the intensity of light for back lighting is lowered to reduce the brightness on the entire screen, the content displayed on screen is still distinctly recognized. Furthermore, by lowering the intensity of light, the power consumption of the backlight module 8 is reduced as well, leading to a longer battery operation time for the image recording and reproducing apparatus.

FIG. 5 is a block diagram showing, as a second embodiment of the present invention, another arrangement of the driving circuit 9 in the image recording and reproducing apparatus of FIG. 1. The construction of the recording and reproducing apparatus in the second embodiment remains identical to that of the recording and reproducing apparatus in the first embodiment except for the driving circuit 9.

Referring to FIG. 5, two clock generators 9h and 9i in the driving circuit 9 output respective clock pulses having different clock frequencies. The clock pulses output from the clock generators 9h and 9i are fed to a switch 9j that is controlled by a control signal from the system control module 14. The switch 9j feeds one of the clock pulses output from the clock generators 9h and 9i to a counter 9k. The counter 9k counts the clock pulse fed from one of the clock generators 9h and 9i via the switch 9j, and feeds to the decoder 9l count data corresponding to its output count.

The decoder 9l decodes the count data fed by the counter 9k, and outputs a positive backlight driving pulse to a backlight driving circuit 9m. The backlight driving circuit 9m drives the backlight module 8 based on the backlight pulse fed by the decoder 9l, to illuminate from back the display section of the liquid crystal display device 7 that is driven by the crystal driving circuit 9n based on the clock pulse supplied by one of the clock generators 9h and 9i via the switch 9j.

Figure 6:
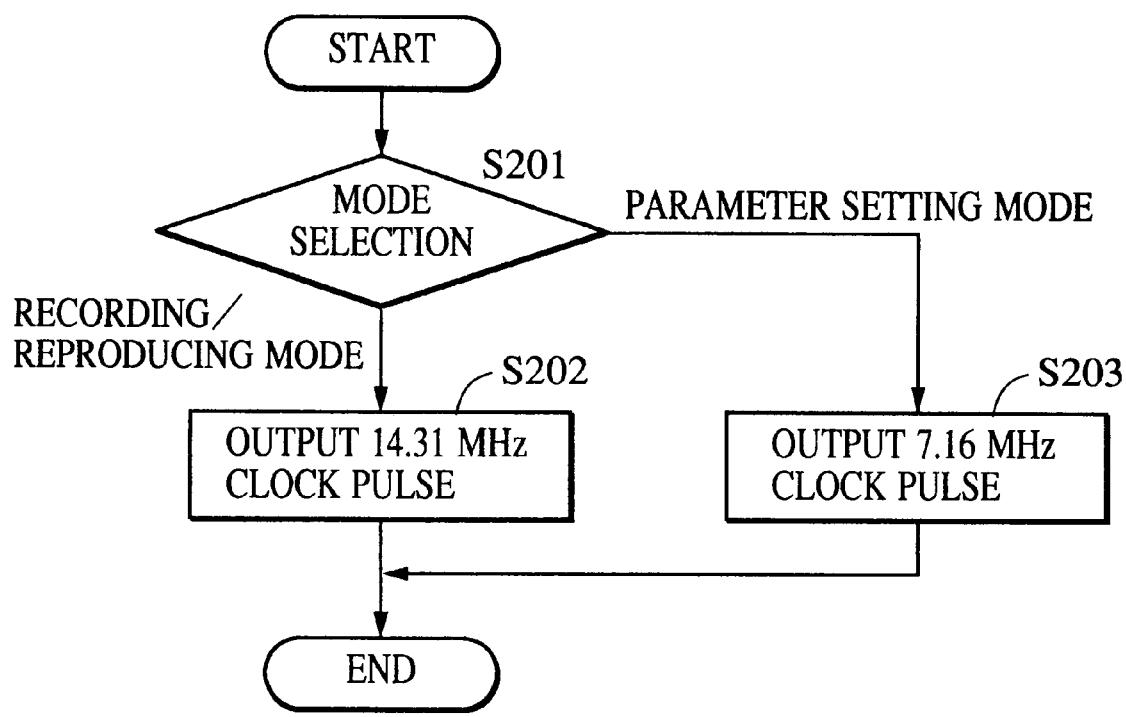
FIG. 6 is a flow diagram of a liquid crystal display operation by the driving circuit 9 of FIG. 5.

FIG. 6 is a flow diagram showing a liquid crystal display driving operation by the driving circuit 9 shown in FIG. 5.

Referring to the flow diagram shown in FIG. 6, discussed is the driving operation of the liquid crystal display device in the image recording and reproducing apparatus according to the second embodiment of the present invention shown in FIGS. 1 and 5.

When the image recording and reproducing apparatus is switched on, the system control module 14 checks the status of switches arranged on the operation panel 13 (step S201).

When the recording mode or the reproducing mode is selected by the mode selection switch on the operation panel 13, the system control module 14 outputs the control signal to the switch 9j in the driving circuit 9 shown in FIG. 5, connects the switch 9j to the output of the clock generator 9h, and thus supplies to a liquid crystal display circuit 9n a clock pulse of 14.31 MHz, for example (step S202).

When a parameter setting mode is selected by the mode selection switch on the operation panel 13 to set a diversity of parameter values in the recording mode or reproducing mode (settings for an exposure, an exposure time, a self-timer, and reproduction method of multiple images, for example), the system control module 14 issues the control signal to the switch 9j in the driving circuit 9 shown in FIG. 5. The system control module 14 connects the switch 9j to the output of the clock generator 9i, and thus supplies to the liquid crystal display driving circuit 9n a clock pulse of 7.16 MHz, for example (step S203).

During the parameter setting mode, the driving rate of the liquid crystal display device 7 in the liquid crystal display circuit 9n in the driving circuit 9 is approximately half the rate during the recording mode or reproducing mode.

When the display device presents text-based information as in the parameter setting mode, a change in a text display section on the display screen is small. Even if the driving rate of the liquid crystal display device 7 is set to be approximately half the rate during the recording mode or reproducing mode, no difficulty is presented in viewing the content displayed. Reducing the driving rate of the liquid crystal display device 7 lowers the power consumption by the liquid crystal display device 7. As a result, a battery operation time of the image recording and reproducing apparatus is prolonged.

As described above, the present invention presents an image recording and reproducing apparatus which features low power consumption, easy-to-use, and long battery life characteristics.

What is claimed is:

1. An image recording/reproducing apparatus for displaying an image represented by an image signal corresponding to an object and a reproduced image represented by an image signal reproduced from a storage medium, comprising:

display means, provided with a first display mode that permits binary image displays at a low-brightness level and at a high-brightness level and a second display mode that permits multi-level image displays at the low-brightness level display, the high-brightness level display and an intermediate level, for displaying the image represented by the image signal corresponding to the object and the reproduced image represented by the image signal reproduced from the storage medium;

operation mode designating means having operation modes including a recording mode that permits said apparatus to operate to store in the storage medium the image signal corresponding to the object, a reproducing mode that permits said apparatus to operate to reproduce the image signal recorded in the storage medium, and a condition setting mode that permits conditions of operation in said recording mode or said reproducing mode to be set, said operation mode designating means designating one from among said operation modes so that said apparatus operates in the designated operation mode; and controlling means for controlling said display means such that said display means operates in said second display mode when said recording mode or said reproducing mode has been designated by said operation mode designating means while, when said condition setting mode has been designated by said operation mode designating means, said display means operates in said first display mode.

2. An image recording/reproducing apparatus according to claim 1, wherein said controlling means is arranged to vary the levels of brightness of display performed by said displaying means such that the levels of brightness in said first display mode are lower than the levels of brightness in said second display mode.

3. An image recording/reproducing apparatus according to claim 2, wherein said display means comprises a display section for displaying an image, an illuminating section for illuminating said display section, and an illumination driving section for outputting a driving pulse that drives said illuminating section.

4. An image recording/reproducing apparatus according to claim 3, wherein said control means controls a pulse width of the driving pulse output from said illumination driving section to be shorter when said display section displays in the first mode than when said display section displays in the second mode.

5. An image recording/reproducing apparatus according to claim 2, wherein said display means comprises a liquid crystal display device for displaying an image, a backlight module for illuminating from behind said liquid crystal display device, and a backlight driving module for outputting a driving pulse that drives said backlight module.

6. An image recording/reproducing apparatus according to claim 5, wherein said control means controls a pulse width of the driving pulse output from said backlight driving module to be shorter when said liquid crystal display device displays in the first mode than when the liquid crystal display device displays in the second mode.

7. An image recording/reproducing apparatus for displaying an image represented by an image signal corresponding to an object and a reproduced image represented by an image signal reproduced from a storage medium, comprising:

display means, provided with a first display mode for displaying text and character information and a second display mode for displaying image information, for displaying the image represented by the image signal corresponding to the object and the reproduced image represented by the image signal reproduced from the storage medium;

operation mode designating means having operation modes including a recording mode that permits said apparatus to operate to store in the storage medium the image signal corresponding to the object, a reproducing mode that permits said apparatus to operate to reproduce the image signal recorded in the storage medium, and a condition setting mode that permits conditions of operation in said recording mode or said reproducing mode to be set, said operation mode designating means designating one from among said operation modes so that said apparatus operates in the designated operation mode; and controlling means for controlling said display means such that said display means operates in said second display mode when said recording mode or said reproducing mode has been designated by said operation mode designating means while, when said condition setting mode has been designated by said operation mode designating means, said display means operates in said first display mode.

8. An image recording/reproducing apparatus according to claim 7, wherein said controlling means is arranged to vary the levels of brightness of display performed by said displaying means such that the levels of brightness in said first display mode are lower than the levels of brightness in said second display mode.

9. An image recording/reproducing apparatus according to claim 8, wherein said display means comprises a display section for displaying an image, an illuminating section for illuminating said display section, and an illumination driving section for outputting a driving pulse that drives said illuminating section.

10. An image recording/reproducing apparatus according to claim 9, wherein said control means controls a pulse width of the driving pulse output from said illumination driving section to be shorter when said display section displays in the first mode than when the display section displays in the second mode.

11. An image recording/reproducing apparatus according to claim 8, wherein said display means comprises a liquid crystal display device for displaying an image, a backlight module for illuminating from behind said liquid crystal display device, and a backlight driving module for outputting a driving pulse that drives said backlight module.

12. An image recording/reproducing apparatus according to claim 11, wherein said control means controls a pulse width of the driving pulse output from said backlight driving module to be shorter when the liquid crystal display device displays in the first mode than when the liquid crystal display device displays in the second mode.

13. An image recording/reproducing apparatus according to claim 7, wherein said controlling means is arranged to vary a driving frame rate of said displaying means such that the driving frame rate in said first display mode is lower than the driving frame rate in said second display mode.

14. An image recording/reproducing apparatus according to claim 13, wherein the display means comprises a display section for displaying an image, an illuminating section for illuminating the display section, and an illumination driving section for outputting a driving pulse that drives the illuminating section.

15. An image recording/reproducing apparatus according to claim 14, wherein said control means controls a frame rate of the display section to be lower when the display section displays in the first mode than when the display section displays in the second mode.

16. An image recording/reproducing apparatus according to claim 13, wherein said display means comprises a liquid crystal display device for displaying an image, a backlight module for illuminating from behind said liquid crystal display device, and a backlight driving module for outputting a driving pulse that drives said backlight module.

17. An image recording/reproducing apparatus according to claim 16, wherein said control means controls a frame rate of said liquid crystal display device to be lower than when said liquid crystal display device displays in the first mode than when said liquid crystal display device displays in the second mode.

18. An image recording/reproducing apparatus for displaying an image represented by an image signal corresponding to an object and a reproduced image represented by an image signal reproduced from a storage medium, comprising:

display means, provided with a first display mode for displaying a diversity of information when imaging parameters for the object are set and when reproducing parameters for the image signal reproduced from the storage medium are set, and a second display mode for displaying the image of the object and the reproduced image, for displaying the image represented by the image signal corresponding to the object and the reproduced image represented by the image signal reproduced from the storage medium;

operation mode designating means having operation modes including a recording mode that permits said apparatus to operate to store in the storage medium the image signal corresponding to the object, a reproducing mode that permits said apparatus to operate to reproduce the image signal recorded in the storage medium, and a condition setting mode that permits conditions of operation in said recording mode or said reproducing mode to be set, said operation mode designating means designating one from among said operation modes so that said apparatus operates in the designated operation mode; and controlling means for controlling said display means such that said display means operates in said second display mode when said recording mode or said reproducing mode has been designated by said operation mode designating means while, when said condition setting mode has been designated by said operation mode designating means, said display means operates in said first display mode.

19. An image recording/reproducing apparatus according to claim 18, wherein said controlling means is arranged to vary the levels of brightness of display performed by said displaying means such that the levels of brightness in said first display mode are lower than the levels of brightness in said second display mode.

20. An image recording/reproducing apparatus according to claim 19, wherein said display means comprises a display section for displaying an image, an illuminating section for illuminating said display section, and an illumination driving section for outputting a driving pulse that drives said illuminating section.

21. An image recording/reproducing apparatus according to claim 20, wherein said control means controls a pulse width of the driving pulse output from said illumination driving section to be shorter when the display section displays in the first mode than when the display section displays in the second mode.

22. An image recording/reproducing apparatus according to claim 19, wherein said display means comprises a liquid crystal display device for displaying an image, a backlight module for illuminating from behind said liquid crystal display device, and a backlight driving module for outputting a driving pulse that drives said backlight module.

23. An image recording/reproducing apparatus according to claim 22, wherein said control means controls a pulse width of the driving pulse output from said backlight driving module to be shorter when the liquid crystal display device displays in the first mode than when the liquid crystal display device displays in the second mode.

24. An image recording/reproducing apparatus according to claim 18, wherein said controlling means is arranged to vary a driving frame rate of said displaying means such that the driving frame rate in said first display mode is lower than the driving frame rate in said second display mode.

25. An image recording/reproducing apparatus according to claim 24, wherein said display means comprises a display section for displaying an image, an illuminating section for illuminating said display section, and an illumination driving section for outputting a driving pulse that drives said illuminating section.

26. An image recording/reproducing apparatus according to claim 25, wherein said control means controls a frame rate of the display section to be lower when said display section displays in the first mode than when said display section displays in the second mode.

27. An image recording/reproducing apparatus according to claim 24, wherein said display means comprises a liquid crystal display device for displaying an image, a backlight module for illuminating from behind said liquid crystal display device, and a backlight driving module for outputting a driving pulse that drives said backlight module.

28. An image recording/reproducing apparatus according to claim 27, wherein said control means controls a frame rate of said display section to be lower when the liquid crystal display device displays in the first mode than when the liquid crystal display device displays in the second mode.

\* \* \* \* \*